April 1, 1930.  H. JUNKERS  1,752,799
RIVETING DEVICE
Filed July 27, 1926   2 Sheets-Sheet 1

Inventor:
Hugo Junkers
by
Atty.

April 1, 1930.  H. JUNKERS  1,752,799
RIVETING DEVICE
Filed July 27, 1926  2 Sheets-Sheet 2
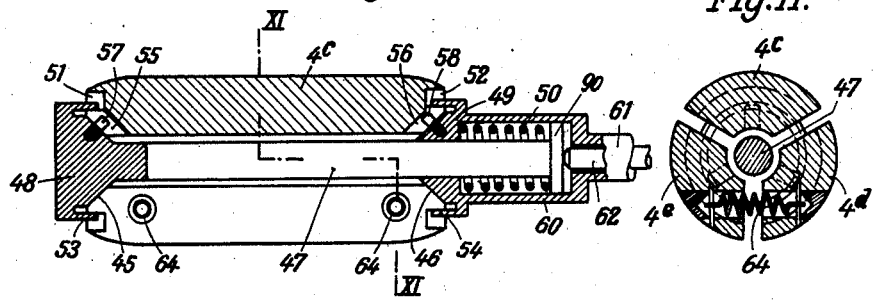
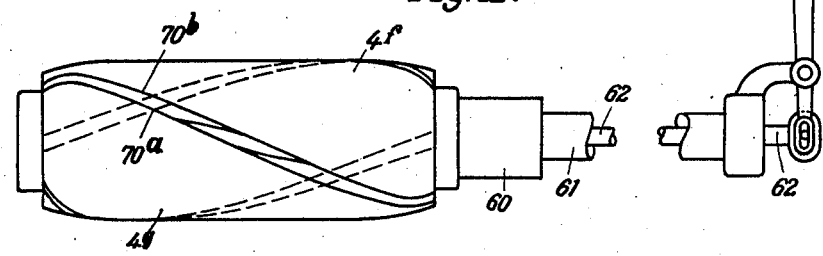
Inventor:
Hugo Junkers
Atty.

Patented Apr. 1, 1930

1,752,799

UNITED STATES PATENT OFFICE

HUGO JUNKERS, OF DESSAU, GERMANY

RIVETING DEVICE

Application filed July 27, 1926, Serial No. 125,204, and in Germany August 21, 1925.

My invention refers to the riveting of tubes of other hollow workpieces and it more particularly concerns a device for riveting axially extending joints of and for securing accessory parts on tubes and the like in an easier and more perfect manner than has hitherto been possible. The invention is applicable more particularly to riveting devices of the kind described in my copending application for patent of the United States, Serial No. 33,481, in which the abutment or anvil inserted in the tube can be displaced and adjusted therein by the operator without this latter being required to change his place in order to effect such displacement and adjustment.

In the riveting device according to this invention the anvil displaceable within the tube or other hollow workpiece is arranged to be set automatically relative to the shaft of the rivet to be acted upon, leaving to the operator merely the longitudinal displacement of the anvil within the workpiece. The automatic setting of the anvil is obtained by resilient means holding the anvil applied against the inner wall of the workpiece in such manner as to give way to the pressure of the rivet shaft which is introduced through a hole in the wall. If the rivet is now acted upon from without by a hammer blow or the like, the anvil is imparted a sudden acceleration and in consequence of its inertia will cause the rivet shaft to be upset and to be converted into a counterhead.

In the drawings affixed to this specification and forming part thereof several different devices are illustrated diagrammatically by way of example.

In the drawings

Figs. 8 and 9 are a longitudinal section and a cross section, respectively, on the line IX— IX in Fig. 8 of a third form which is particularly adapted for use in the riveting of narrow tubes and the like.

Figs. 10 and 11 are similar views of a fourth modification,

Figure 1:
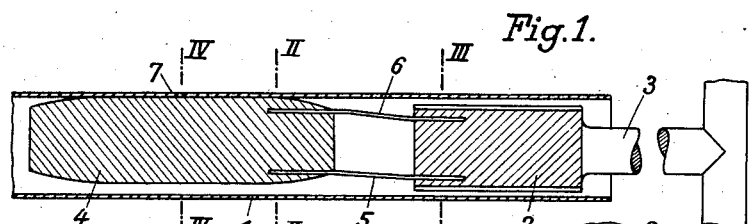
Fig. 1 is a longitudinal section and
Figure 2:
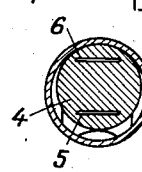
Figs. 2, 3 and 4 are so many cross sections, taken on the lines II—II, III—III and IV—IV, respectively, in Fig. 1 of a particularly simple device embodying this invention.
Figure 3:
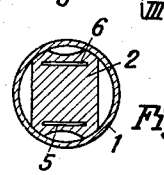
Figure 4:

Fig. 12 is a plan view of a fifth form similar to the one shown in Figs. 10 and 11, Figs. 13 and 14 are a longitudinal section and a cross section, respectively, on the line XIV—XIV in Fig. 13 illustrating a further modification.

Referring first to Figs. 1–4, 1 is a tube to be riveted, 2 is a head fixed to a handle 3 and inserted in the tube and 4 is a solid substantially cylindrical anvil having a diameter which is somewhat inferior to the diameter of the tube. 5 and 6 are two leaf springs having each one end mounted in the head 2 and the other end in the anvil 4. The springs are shaped in such manner as to hold the anvil 4 applied with elastic pressure against that part of the inner wall of the tube, through which rivets shall be introduced. On the introduction of the rivet, such as 8 in Fig. 4, through a hole 7 (Fig. 1) in the wall of the tube the anvil 4 is forced away from the wall by the rivet shaft and is held in this depressed position by the constant pressure exerted on the rivet head by the riveting tool 9. If hammer blows are now applied to the free end of the tool 9, these blows will, owing to the elasticity of the tube wall, be transmitted onto the mass of the anvil 4 and the inertia of this mass will oppose itself to the action of the blow and will thereby cause the rivet shaft to be upset.

The blows upon the tool 9 are followed by reaction blows of the anvil upon the inner end of the rivet as said inner end is upset, due to the resilient mounting of the anvil, thereby greatly facilitating the riveting action.

Figure 5:
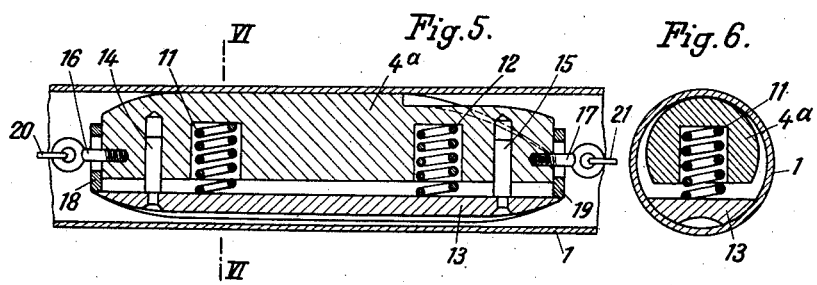
Fig. 5 is a longitudinal section,
Figure 6:
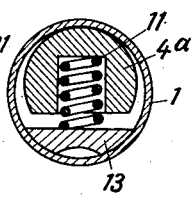
Fig. 6 is a cross section on the line VI—VI in Fig. 5.
Figure 7:
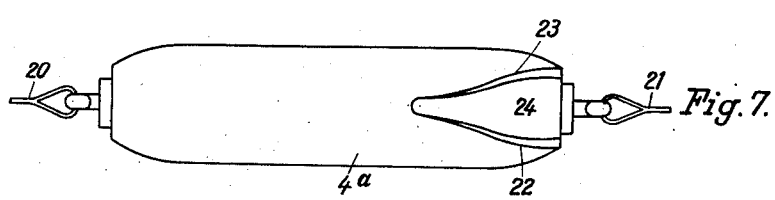
Fig. 7 is a plan view of another modification.

In the device illustrated in Figs. 5–7 the anvil 4ª rests on coil springs 11 and 12 inserted in cavities of the anvil and having their lower ends applied against a slidable abutment 13. A relative displacement of the abutment 13 and anvil 4ª is prevented by pins 14, 15 mounted on the abutment and entering in holes provided in the anvil and by slotted end plates 18, 19. Eyes 16 and 17 mounted in the end faces of the anvil serve for attaching the wires, ropes or chains 20 and 21 extending through the tube in both directions and serving for displacing the anvil and abutment from one rivet hole to the other. Near one or both ends the anvil 4a is formed on its top with helical cam faces 22, 23 bordering a substantially triangular depression which tapers from the end towards the middle portion. This arrangement provides means for readjusting the anvil in the case when it should have been displaced angularly during longitudinal displacement, a pin or other tool being introduced through one of the rivet holes registering with the depressions 24 and the inwards projecting end of this tool serving as an abutment for one of the cam faces 22, 23 which, on being displaced in contact with this abutment, effect the correct adjustment of the anvil.

Figure 8:
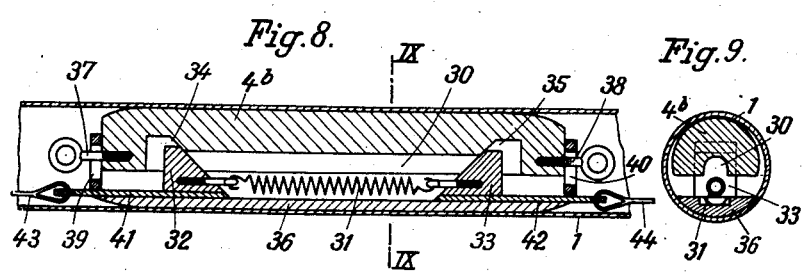
Figure 9:
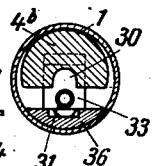

The device illustrated in Figs. 8 and 9 is particularly adapted for use in riveting narrow tubes, the diameter of which would render it difficult to employ a device having coil springs such as 11 and 12 (Fig. 5) inserted between the anvil and abutment. In the device illustrated in Figs. 8 and 9 a longitudinally extending cavity 30 is formed in the back of the anvil 4b ending in cam faces 34, 35 which cooperates with cam pieces or wedges 32, 33, displaceably mounted on the abutment 36 and connected by a pull spring 31. The anvil 4b is guided in vertical direction by means of pins 37, 38 in slotted end plates 39, 40 mounted on the abutment 36. Wires or the like 43, 44 are attached to the ends of slidable plates 41, 42 on which the cam pieces 32, 33 are mounted, which can thus be pulled asunder by means of the wires or the like 43, 44, if it is desired to make the anvil pass below an obstacle in the tube. On the other hand the anvil 4b is capable of being depressed by the rivet shaft, its cam faces 34, 35 gliding on the cam faces of the wedge pieces 32, 33, which are then forced asunder against the action of the spring 31.

In the modification illustrated in Figs. 10 and 11, 4c is the anvil and 4d and 4e are two abutments, all these three pieces having the form of cylinder segments. In order to effect a resilient connection between these three pieces, cam faces 45, 46 are provided at their ends which cooperate with two cones 48 and 49, cone 48 being fixed to the end of a bar 47 extending between the segments, while cone 49 is displaceably mounted on the other end of this bar and is forced inwards by a coil spring 50, the other end of which rests against a collar 90 at the end of the bar 47. The cones tend to force the segments 4d and 4e outwards against the action of coil springs 64. Projections 53, 54 entering corresponding notches 51, 52 in the segments serve for limiting such outward movement. Pins 57, 58 mounted on the cones and projecting into notches 55, 56 of the segments serve for securing a uniform relative distance between the segments. A casing 60 formed integral with the cone 49 forms a connection between the cone and a hollow rod 61 serving for displacing the device within the tube or other work piece. A rod 62 inserted in the hollow rod 61 and projecting into the casing 60 rests against the collar 90 of the bar 47 and, if forced inwards, causes the distance between the cones 48, 49 to be increased, thereby allowing the weak coil springs 64 to pull the segments 4c, 4d, 4e inwards so that any obstacles, such as projecting rivet heads or the like, which may be present within the tube, can be overcome.

In the modification illustrated in Fig. 12 of the device last described the anvil 4f is again associated with two abutments 4g, all three having however the form of helically divided cylinder segments, the helical faces 70a, 70b being spaced from each other. In this device, if one of the gaps between the helical faces should happen to be placed below a rivet hole, the device need only be slightly displaced in longitudinal direction in order to carry a solid part of the surface of the anvil below the hole.

Obviously the cam pieces shown in Figs. 8–11 can also be replaced by compression springs.

If ropes or the like are used for the longitudinal displacement of the device, a double-loop is preferably formed in such ropes, as described more particularly in my copending application, Serial No. 33,411, whereby one point of the loop is displaced in the same direction as the device.

I wish it to be understood that I do not desire to be limited to the exact details of construction shown and described, for obvious modifications will occur to a person skilled in the art.

I claim:—

1. Means for riveting tubes and other hollow bodies comprising an anvil adapted to be displaced within the hollow body and resilient means for holding said anvil applied against the inner wall of said body in such manner as to give way to the pressure of a rivet introduced through a hole in such wall, said anvil consisting of a relatively substantial mass which by virtue of the resilient holding means is capable of delivering blows upon the inner end of the rivet incident to its reaction following blows applied to the outer end of the rivet.

2. Means for riveting tubes and other hollow bodies comprising an anvil adapted to be displaced within the hollow body, an abutment connected and displaceable with said anvil and resilient means for holding said anvil and said abutment applied against different parts of the inner wall of said body in such manner that the anvil can give way to the pressure of a rivet introduced through a hole in such wall, but will swing back and upset the rivet shaft, when a blow hits the rivet.

3. Means for riveting tubes and other hollow bodies comprising an anvil adapted to be displaced within the hollow body, an abutment connected and displaceable with said anvil, two cams inserted between said anvil and said abutment and a spring inserted between said cams and extending longitudinally of said anvil and tending to displace said cams so as to effect a relative radial displacement of said anvil and said abutment, respectively, in opposite direction.

4. Means for riveting tubes and other hollow bodies comprising an anvil adapted to be displaced within the hollow body and bearing against one part of the wall thereof, an abutment connected and displaceable with said anvil and bearing against another part of the wall, resilient means for holding said anvil and said abutment applied against said different parts of the inner wall of said body and symmetrically disposed cam faces on said abutment cooperating with the anvil for readjusting same in position.

5. Means for riveting tubes and other hollow bodies comprising an anvil adapted to be displaced within the hollow body and bearing against one part of the wall thereof, a plurality of abutments connected and displaceable with said anvil and bearing against other parts of said wall and resilient means between said abutments for holding said anvil and said abutments applied against said different parts of the inner wall of said body.

6. Means for riveting tubes and other hollow bodies comprising an anvil adapted to be displaced within the hollow body, a plurality of abutments having the form of helical segments connected and displaceable with said anvil and resilient means between said abutments for holding said anvil and said abutment applied against different parts of the inner wall of said body.

7. Means for riveting tubes and other hollow bodies comprising an anvil adapted to be displaced within the hollow body and bearing against one part of the wall thereof, an abutment connected and displaceable with said anvil and bearing against another part of the wall, resilient means for holding said anvil and said abutment applied against said different parts of the inner wall of said body and means adapted to be actuated from without for moving said anvil away from the inner wall of said body against the tension of the resilient means aforesaid rendering the anvil capable of delivering reaction blows upon said means during the riveting operation.

8. Means for riveting tubes and other hollow bodies comprising an anvil adapted to be displaced within the hollow body, spacing elements displaceably associated with said anvil and springs adapted to act on said elements so as to allow it to give way to the pressure of a rivet introduced through a hole in the wall of such hollow body and to deliver a reaction blow to said rivet during riveting operation.

In testimony whereof I affix my signature.
HUGO JUNKERS.